United States Patent [19]

Godbey et al.

[11] 4,318,298
[45] Mar. 9, 1982

[54] AUTOMATIC LIQUID LEVEL MONITOR

[75] Inventors: John K. Godbey, Dallas; Billy G. Ballard, Garland, both of Tex.

[73] Assignee: Mobil Oil Corporation, New York, N.Y.

[21] Appl. No.: 140,410

[22] Filed: Apr. 14, 1980

Related U.S. Application Data

[63] Continuation of Ser. No. 822,507, Aug. 8, 1977, abandoned, which is a continuation-in-part of Ser. No. 749,940, Dec. 13, 1976, abandoned, which is a continuation of Ser. No. 563,249, Mar. 28, 1975, abandoned.

[51] Int. Cl.³ .............................................. G01S 9/66
[52] U.S. Cl. .................................. 73/155; 73/290 V; 367/108
[58] Field of Search ............... 73/155, 290 V; 367/33, 367/908, 81, 108

[56] References Cited

U.S. PATENT DOCUMENTS

| | | | |
|---|---|---|---|
| 2,047,974 | 7/1936 | Lehr et al. | 367/81 |
| 2,190,141 | 2/1940 | Walker | 367/81 |
| 2,232,476 | 2/1941 | Ritzmann | 367/908 |
| 2,775,748 | 12/1956 | Rod et al. | 73/290 V |
| 3,100,023 | 8/1963 | Clements | 73/290 V |
| 3,100,885 | 8/1963 | Welkowitz et al. | 73/290 V |
| 3,184,969 | 5/1965 | Bolton | 73/290 V |
| 3,316,997 | 5/1967 | McCoy | 73/290 V |
| 3,486,377 | 12/1969 | Franchi | 73/290 V |
| 3,985,030 | 10/1976 | Charlton | 73/290 V |

*Primary Examiner*—Anthony V. Ciarlante
*Attorney, Agent, or Firm*—Charles A. Huggett; Michael G. Gilman; James F. Powers, Jr.

[57] ABSTRACT

Apparatus for determining the location of the liquid level in a well or borehole. A source of acoustic pressure pulses is coupled to the surface casing so that they are transmitted down the well and reflected by the gas-liquid interface. A transducer is also coupled to the well to produce an electrical signal in response to direct and reflected acoustic pulses occurring in the well. Gating circuitry responds to the transducer for starting and stopping the counting of clock pulses by a digital counter. A digital readout device is used to indicate the depth to the liquid level in the well. The acoustic pulse source is automatically actuated at predetermined times, and the depth to the liquid level and the time are automatically recorded. This produces a record of time and liquid depth which can extend over a period of several days.

27 Claims, 11 Drawing Figures

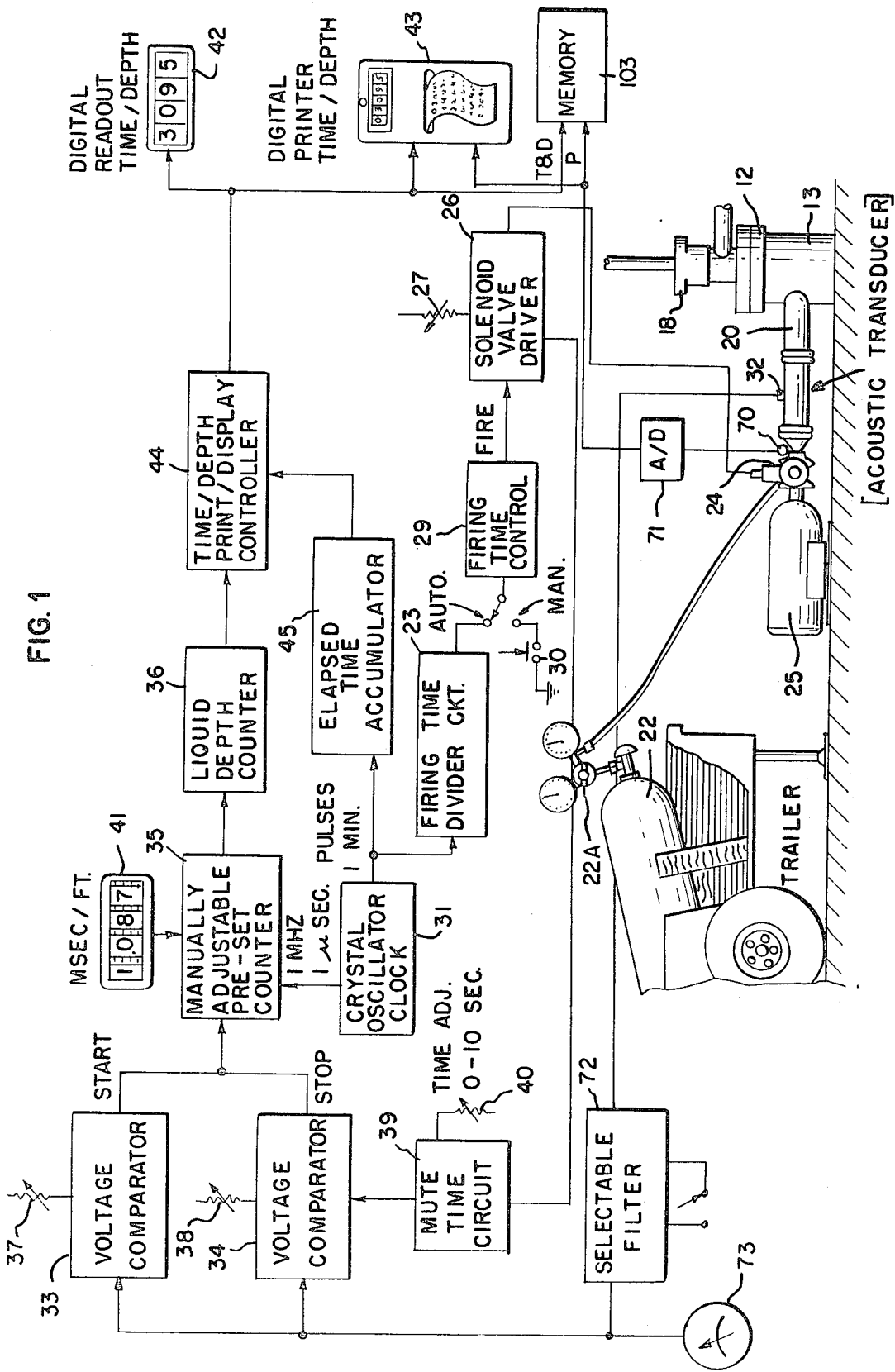

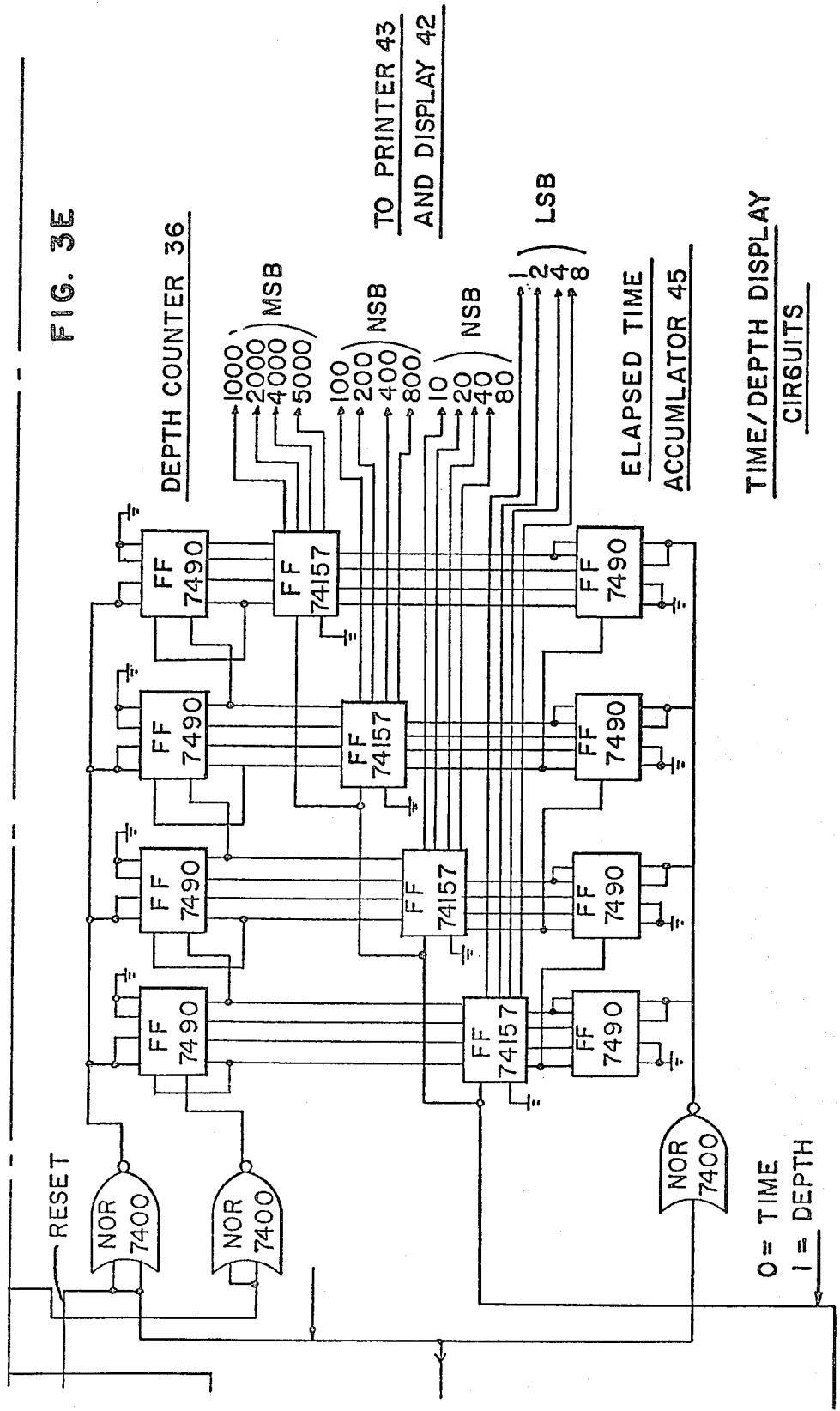

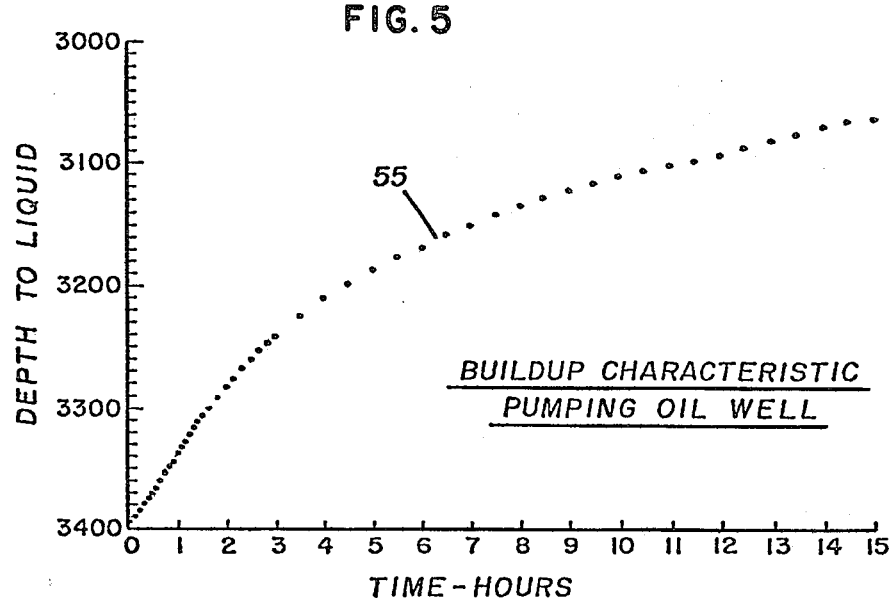
FIG. 5
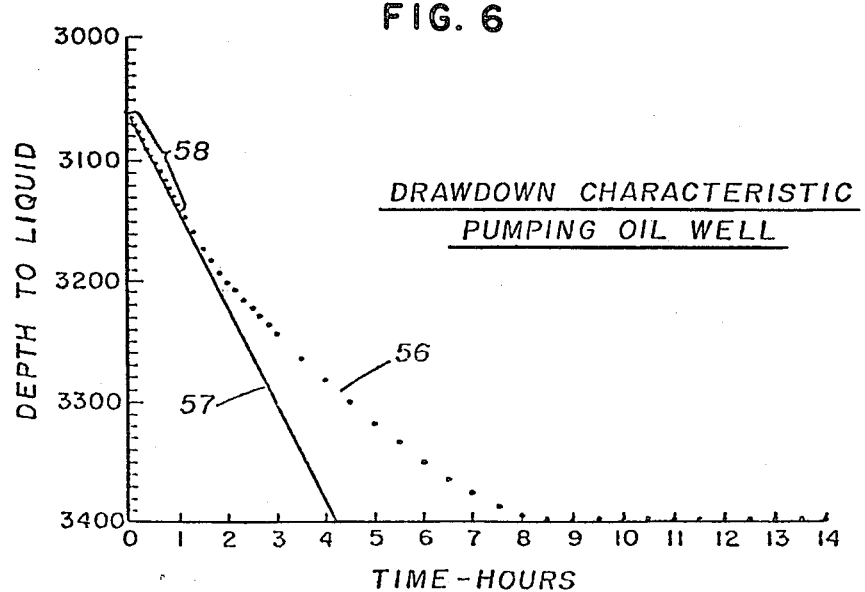
FIG. 6
FIG. 4

AUTOMATIC LIQUID LEVEL MONITOR

This is a continuation of application Ser. No. 822,507, filed Aug. 8, 1977, now abandoned, which was a continuation-in-part of application Ser. No. 749,940 filed Dec. 13, 1976, now abandoned, which was a continuation of application Ser. No. 563,249, filed Mar. 28, 1975 now abandoned. Application Ser. No. 822,507 filed Aug. 8, 1977 is a divisional continuation-in-part directed to a liquid level controller.

BACKGROUND OF THE INVENTION

This invention relates to well sounding and more particularly to apparatus for and methods of automatically continuously determining the depth of the liquid surface of a well.

PRIOR ART

The state of the art techniques are represented by the Sonolog instrument made by the Keystone Development Corporation of Houston, Tex., and the Echometer Instrument made by the Echometer Company of Wichita Falls, Tex. The Echometer instrument is of the type shown in U.S. Pat. No. 3,316,997 McCoy. The recordings of acoustic amplitude vs. time are essentially the same for both instruments and are illustrated in FIGS. 8 and 9 of U.S. Pat. No. 2,232,476 Ritzman. When the electrical output signal of the acoustic transducer is passed through a high-pass filter, the short, high-frequency reflections from tubing collars are emphasized. When a low-pass filter is used, the low-frequency pulse from the gas-liquid interface is more easily distinguished on the record. The depth to the liquid surface is then determined by counting the number of tubing collars above the liquid interface and multiplying by the average distance between the collars.

Commonly, the initiating acoustic pulse is generated in the annulus between the well casing and the string production tubing in a producing oil well. The source of the initiating acoustic pulse is usually a blank cartridge fired into this annulus, such as described in U.S. Pat. No. 3,100,023 Clements. Another less-used technique is to discharge compressed gas into the annulus as is described in PETROLEUM PRODUCTION ENGINEERING-OIL FIELD EXPLOITATION, Third Edition, by Lester C. Uren, McGraw Book Company, Inc., New York, Toronto, London (1953), pp. 143-146. State of the art well sounding techniques such as these require an operator to trigger the acoustic source, manipulate the filter circuit and obtain the resultant record on a time-driven strip chart recorder. Because of this, it is not economical to use this technique to obtain frequent measurements of the liquid level to trace the movement of the liquid column over long periods of time. The movement of this liquid column in response to the inflow of fluid into a shut-in well or during pump down after the well has been shut in and allowed to build up is especially important to the petroleum engineer in analyzing the well performance characteristics.

This invention relates to a method of repetitively sounding a well over a long period of time which does not require an operator to be present at each sounding. Another advantage for repetitively taking well soundings over long periods of time is that it is often not possible to obtain the liquid level on a one-shot basis because of foam or a bubble blanket on the liquid surface. When this condition exists, the acoustic pulse is absorbed and no reflected pulse is generated. It has been demonstrated that in most cases the formation of foam on the liquid surface is a transient condition. Thus, by repetitive sounding the true liquid level can be determined during the occasional periods when the foam disappears and a reflection is generated. Only a fortuitous firing using the single-shot method would produce a usable well sounding record.

Another source of error in the state-of-the-art techniques is the lack of accuracy in determining the liquid depth. Since the tubing collars are used to measure the depth, the actual distance between these collars or the length of each joint of tubing must be known. This is seldom the case except where the tubing is strapped as it is being placed in the well. As an example, tubing lengths assembled in a string may be nominally $30 \pm 2$ feet in length. In a well having, for example, 150 joints of tubing, the variations from nominal length may be cumulative and the depth error may be appreciable. Also, it is difficult by this method to determine the depth to an accuracy greater than one joint of tubing (about 30 feet).

Another source of error involves the operators interpretation of the record and his skill in manipulating the filter settings. The problems of interpretation is especially noticeable in deep wells that exhibit a relatively high bottom-hole temperature. The acoustic velocity increases with an increase in temperature. Therefore, the tubing collars near the bottom of the well will appear closer together on the chart record than the upper collars. In most cases the reflections from these lower collars are too small to be recorded and are ignored. In establishing the depth scale in this case, only the upper collars are generally used. This results in an interpretation error that may be large. This also emphasizes the lack of consistency in interpreting many successive soundings on one well.

SUMMARY OF THE INVENTION

This invention overcomes many of the shortcomings of the state of the art techniques described above. It provides a method of obtaining the buildup and drawdown characteristics of a producing well with great accuracy. By calibrating at the maximum depth to the fluid interface, an accurate determination of the average acoustic velocity in the well can be determined. Variations in the fluid depth of only a few feet can be observed by this method without any interpretive errors. No change in filter or gain settings is required. The low-frequency return pulse from the liquid surface is the only reflected pulse necessary for satisfactory operation. The automatic firing of the initiating pulse and recording of the liquid depth and time do not require an operator to be present and provide a method of measuring fluid levels under transient foaming conditions when taken over long periods of time. This ability to record liquid depth while the apparatus is unattended is particularly important in obtaining the buildup characteristics of a marginally producing well in which pressure buildup must be measured over a long period of time.

In accordance with this invention, the location of the liquid surface of a well is determined by repetitively actuating a source of acoustic pulses and continuously indicating a digital reading of elapsed time between each initiating acoustic pulse and the reflected pulse.

In accordance with another aspect of this invention, the well sounding apparatus is calibrated for the differing acoustic velocity characteristics of each well by pumping the liquid in the well down to the known level of the pump inlet in the well and changing the number of pulses digitally counted until the indicated digital count corresponds with the known depth of the pump inlet in the well.

Alternatively, calibration can be performed by detecting the returns from tubing collars which have a known separation. A selectable band pass filter in the input circuit passes either returns from the liquid surface or returns from tubing collars. A mute circuit is adjusted so that returns from the desired tubing collar are detected and calibration is made on these returns.

In accordance with a specific embodiment, a manually adjustable pulse counter produces one pulse output for an adjustable number of input clock pulses. By manually adjusting this pulse counter, calibration for acoustic velocity is obtained.

In accordance with another aspect of the invention, the circuits which produce the starting and stopping signals for the digital counter have adjustable trigger levels to make them immune from noise which might otherwise cause erroneous indication of elapsed time or depth.

In accordance with another aspect of the invention, a calibrated mute time circuit is actuated coincidentally with the initiating acoustic pulse and renders the circuit which stops the digital counter inoperative for a known adjustable period of time after the occurrence of each initiating acoustic pulse. This calibrated mute time circuit allows the operator to gate out any undesired noise or reflected signal, especially those generated near surface.

In accordance with another aspect of the invention, an adjustable firing time rate circuit provides means for adjusting the repetitive firing time of the source of acoustic pulses.

In accordance with another aspect of the invention, a digital measure of the depth of the liquid level in the well is recorded together with a recording of the time of each initiating acoustic pulse with respect to the time that automatic operation of the equipment was started. The casing pressure is also recorded to facilitate the determination of bottom hole pressure in a producing well. Where the monitor of this invention is used to control a pump, the times at which the pump is turned on and off are recorded to facilitate analysis of the production from the well.

In accordance with another aspect of this invention, the initiating acoustic pulses are generated by a solenoid valve releasing compressed gas in response to a timing circuit which determines how long the valve is open. In this way, shape and duration of the initiating acoustic pulse can be changed in accordance with the mode of operation of the equipment.

Other objects, features, and advantages of the invention will be better understood from the following description and appended claims.

BRIEF DESCRIPTION OF THE DRAWINGS

FIG. 1 is a block diagram of the automatic liquid level monitor;

FIG. 4 shows a digital tape readout of time and depth obtained with the monitor;

FIG. 5 shows a buildup curve on a well using data obtained with the monitor; and FIG. 6 shows a typical drawdown curve on a well using data obtained with the monitor.

DESCRIPTION OF THE PREFERRED EMBODIMENT

Figure 1A:
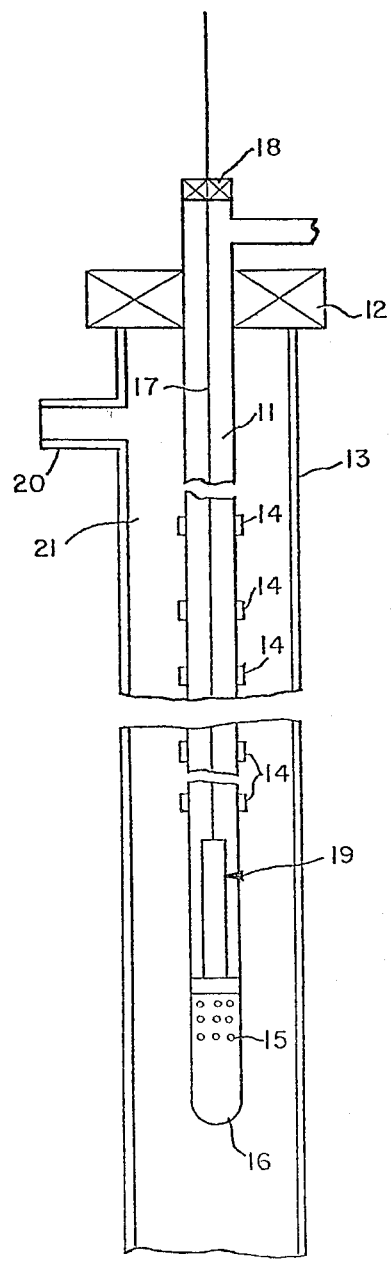
FIG. 1A shows a typical well makeup.

FIG. 1A shows a typical well in which the automatic monitor may be used. A string of tubing 11 is suspended by a tubing hanger 12 within a casing 13. The tubing includes a number of sections joined by tubing collars 14. The tubing has a pump inlet 15 and usually terminates in a gas anchor 16. A sucker rod 17 extends through a packing gland 18. A pump 19 is connected to the sucker rod. The casing nipple 20 is used to couple acoustic pulses to the annulus 21 between the string of tubing 11 and the casing 13.

Figure 2:
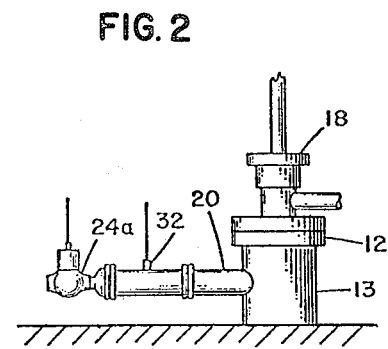
FIG. 2 shows an alternate connection for the sounder using a two-port valve on a pressured casing.

Referring to FIG. 1, the source of acoustic pulses includes a compressed gas cylinder 22 which commonly contains nitrogen. Gas from cylinder 22 flows through pressure regulator 22A and through the three-way solenoid valve 24 to the expansion chamber 25. Solenoid valve 24 repetitively couples gas from the chamber 25 to the casing nipple 20 to generate initiating acoustic pulses in the well annulus. If the gas pressure in the well annulus is above about 30 psig, then a two-port valve 24a (FIG. 2) can be used to produce the acoustic pulse by venting the pressure momentarily to the atmosphere. This method can be used for generating the initial pulse in all the embodiments disclosed here, if the annulus pressure is sufficient to meet the requirements.

The opening of solenoid valve 24 is controlled by valve driver 26 which has a manual adjustment 27 for controlling the duration of each acoustic pulse. Digital electronics including a firing time divider circuit 23 and a firing time control circuit 29 are used to obtain an initiating acoustic pulse according to any desired time schedule. Alternatively, the source may be manually initiated by depressing the firing push button 30.

The firing time circuits are controlled by the clock pulse source 31. Clock pulses from this source are also used in the digital readout circuitry.

An acoustic transducer 32 is coupled to the well and produces an electric signal in response to the occurrence of acoustic pulses in the well annulus. Electric signals from the transducer 32 are applied to gating means, including the first voltage comparator circuit 33. Voltage comparator circuit 33 produces a start pulse. Upon the occurrence of the initiating acoustic pulse in the well, this starts counting of clock pulses by digital means, including preset counter 35, depth counter 36, and the mute time circuit 39.

The second voltage comparator 34 produces a stop pulse upon detection of the acoustic pulse reflected from the liquid surface of the well. The stop pulse is connected to the preset counter 35 to stop the counting of clock pulses.

The first voltage comparator circuit 33 has an adjustable trigger level set by the potentiometer 37. This allows the operator to set the level of the signal which produces a start pulse so that the circuit detects the initiating acoustic pulse. Similarly, the second voltage comparator circuit 34 has an adjustable trigger level set by the potentiometer 38 so that the circuit detects the desired reflected pulse.

The mute time circuit 39 is actuated by the solenoid valve driver 26 coincidentally with the initiating acoustic pulses. The mute time circuit 39 is connected to the second voltage comparator circuit 34 to render it inoperative for a known adjustable period of time after the occurrence of each initiating acoustic pulse. Mute time circuit 39 includes a calibrated time adjustment 40. In an alternate embodiment described in our divisional application, the time adjustment 40 is replaced with a manually settable digital register.

Manually adjustable pulse counter 35 produces one output pulse for a given number of input pulses and the given number is adjustable. Clock pulses of 500 KH or 2 $\mu$sec period pulses from source 31 are applied as input pulses. Since the manually settable switch 41 is calibrated in terms of $\mu$sec/foot the 2 $\mu$sec pulses are used to account for the round-trip travel time of the acoustic pulse. This switch 41 is then read in terms of inverse velocity in $\mu$sec/ft. The pulse output from counter 35 is applied to the depth counter 36 which accumulates one pulse for each increment of depth in the well, for example, one pulse for each foot of depth.

Digital readout devices are responsive to the count in counter 36 for indicating the depth of the liquid surface. These include a digital readout 42 and a digital printer 43. These are controlled by the controller 44 which determines whether each of the devices is to display depth, elapsed time or pressure. The elapsed time accumulator 45 records time with respect to the start of automatic operation. That is, when a well is being automatically logged by repetitive firing of the acoustic pulse source, the accumulator 45 counts every one-minute pulse which occurs after the start of this automatic operation. This accumulated time can be displayed on the digital readout 42. The time is also recorded by the printer 43. Printer 43 produces a printout 43a (FIG. 4) of the depth of the liquid level together with the time of occurrence of the initiating pulse producing that depth reading and the casing pressure.

A pressure gage 70 of the strain gage type measures casing pressure. The measured casing pressure is converted to a digital signal in the analog to digital converter 71 and is also recorded on the printer 43 at each sounding. This casing pressure is used in the determination of bottom hole pressure in a producing well.

A selectable filter 72 in the input circuit (FIG. 1) can be switched to detect the liquid level in the well or the tubing collars. The frequency content of the echo from the liquid level is centered about 5 Hz and the echo from the collars is centered around 20 Hz. These center frequencies may be easily changed to suit a particular well. The purpose of detecting tubing collars is to permit the direct determination of the acoustic velocity for the calibration of the timing circuit.

A peak reading signal strength meter 73 aids in visually determining the arrival of the echo and in setting the sensitivity control. The loss of echo is commonly caused by the presence of foam on a liquid surface. Meter 73 provides the means for visually observing whether an echo is received and the sensitivity is adjusted according to the meter reading.

The operation of the apparatus in performing a well logging operation is as follows. The firing time rate circuitry including a divider circuit 23 and firing time control circuit 29 controls the firing time of initiating acoustic pulses which are coupled to the casing nipple 20. These acoustic pulses are detected by the transducer 32. Clock pulses from source 31 are counted by counter 36 through the preset counter 35 in the time interval between the generation of an initiating acoustic pulse and the detection of a reflected acoustic pulse. Digital readout device 42 and printer 43 continuously produce an indication of the digital count as a measure of the depth to the liquid level in the well. At the beginning of an operation, the apparatus is calibrated for differing acoustic velocity characteristics in one of two ways.

First, the pump 19 is started and the well is pumped down to the known level of the pump inlet. Assume that this is known to be at 2,000 feet and the reading on the digital display 42 is 2400 feet. If the initial dial setting of switch 41 is 1.000 milliseconds per foot, then the true reading of switch 41 can be determined by the simple ratio of:

$$\frac{\text{depth reading}}{\text{true depth}} = \frac{\text{true dial setting}}{\text{initial dial setting}} = \frac{2400}{2000} \ 1.2M \text{ sec}$$

This procedure determines the acoustic velocity characteristic which can be read from the manually settable switch in milliseconds per foot. This acoustic velocity characteristic can usually be used in logging other wells in the same field. These other wells will normally have the same acoustic velocity characteristic if the gas gravity is the same. When it is desired to log them, the acoustic velocity characteristic is set by the switch 41 without the need for going through the calibrating procedure.

Another calibration procedure can be performed with the apparatus described in this invention that can be used when the well cannot be pumped down and the actual liquid level cannot be determined from other wells producing from the same formation. The manually adjustable preset counter 35 is set to any convenient velocity setting, such as one millisecond per foot, and the liquid level depth determined, for example, 1818 feet. The trigger level or sensitivity adjustment of the voltage comparator circuit 34 is then set at a low level. The selectable filter 72 is then set so that the acoustic pulses reflected from tubing collars are detected. The mute time adjustment 40 is then increased so that only the collars near the center of the gas column can be detected, for example, 909 feet. Under these conditions, the depth of a collar near the midpoint of the gas column will be indicated on the depth display. Assume a depth of 924 feet is recorded. The mute time is then increased so that the next collar is detected at a recorded value of, for example, 951 feet. The difference indicates a collar separation of 27 feet when it should be about 30 feet. To correct the error, the velocity set on the preset counter 35 should be increased by the ratio of 30 to 27, thus yielding an average velocity setting of 1.111 milliseconds per foot. This process should be repeated on successive pairs of collars to obtain a more accurate average velocity figure. The new velocity of 1.111 milliseconds per foot is then set on the manually adjustable preset counter 35, the mute time is reduced to eliminate only the near surface reflections, and the trigger level adjustment is returned to the normal setting for detecting the liquid level. The new liquid level is found to be more accurately located at 2020 feet and the calibration procedure is complete.

This calibration procedure assumes a linear temperature gradient in a well so that the average velocity in the annulus gas is near the middle of the gas column.

The addition of the filter 72 greatly enhances the discrimination between signals reflected from the liquid surface and the collars.

The measured depth, time and pressure are stored in memory 103. Digital printers do not operate well in subfreezing temperatures. Therefore, a 16K bit random access memory 103 has been provided, and will accommodate up to 341 readings consisting of time, depth and casing pressure. After the data is stored and held in the memory, the printer can be plugged into the memory receptacle and the data stored in the memory can be printed out. In use, the printer would be kept in a relatively warm location before retrieval of the data and therefore not subject to the low ambient temperatures except for the short time necessary to print the data. As more fully described in the divisional application, the on and off times of the pump may also be stored in the memory 103.

The circuitry of this invention may take many forms within the skill of a person working in this art. The circuitry shown in FIGS. 3A-3E is one example only of the circuitry used to implement FIG. 1. The function of the individual integrated circuits in this diagram is indicated either by the shape of each unit or letters within a rectangle. These symbols conform to the American Standard Graphic Symbols AIEE 91-ASA Y 32.14-1962. These integrated circuits can be obtained from a number of manufacturers.

Figure 3:
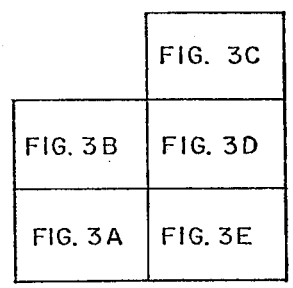
FIG. 3 shows the manner in which FIGS. 3A–3E together show a circuit diagram of the automatic liquid level monitor.
Figure 3A:
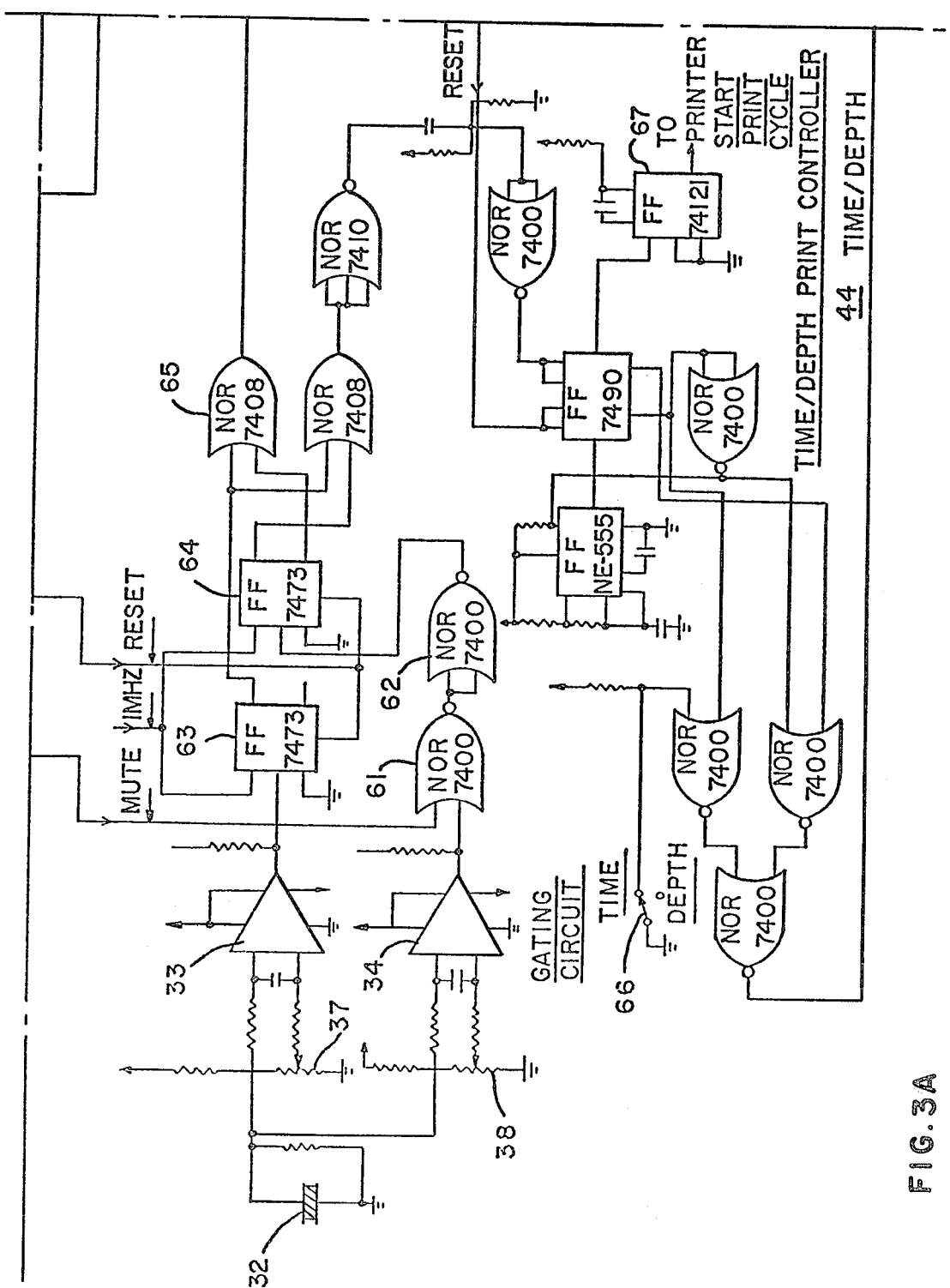

FIG. 3A shows the transducer 32 which produces an electric signal in response to the occurrence of acoustic pulses in the annulus. This electric signal is applied to the first voltage comparator circuit 33 and to the second voltage comparator circuit 34. Both circuits have a potentiometer, 37 and 38, respectively, for adjusting the trigger level. The outputs of circuits 33 and 34 are applied to circuitry including NAND gates 61 and 62 and flip-flops 63 and 64. AND gate 65 produces an output which controls the starting and stopping of the preset counter 35, shown in FIG. 3D.

FIG. 3A also shows a switch 66 which controls whether the readout 42 and the printer 43 display time or depth. The output from the delay flip-flop 67 starts the printer 43 recording time with respect to the start of automatic operation.

Figure 3B:
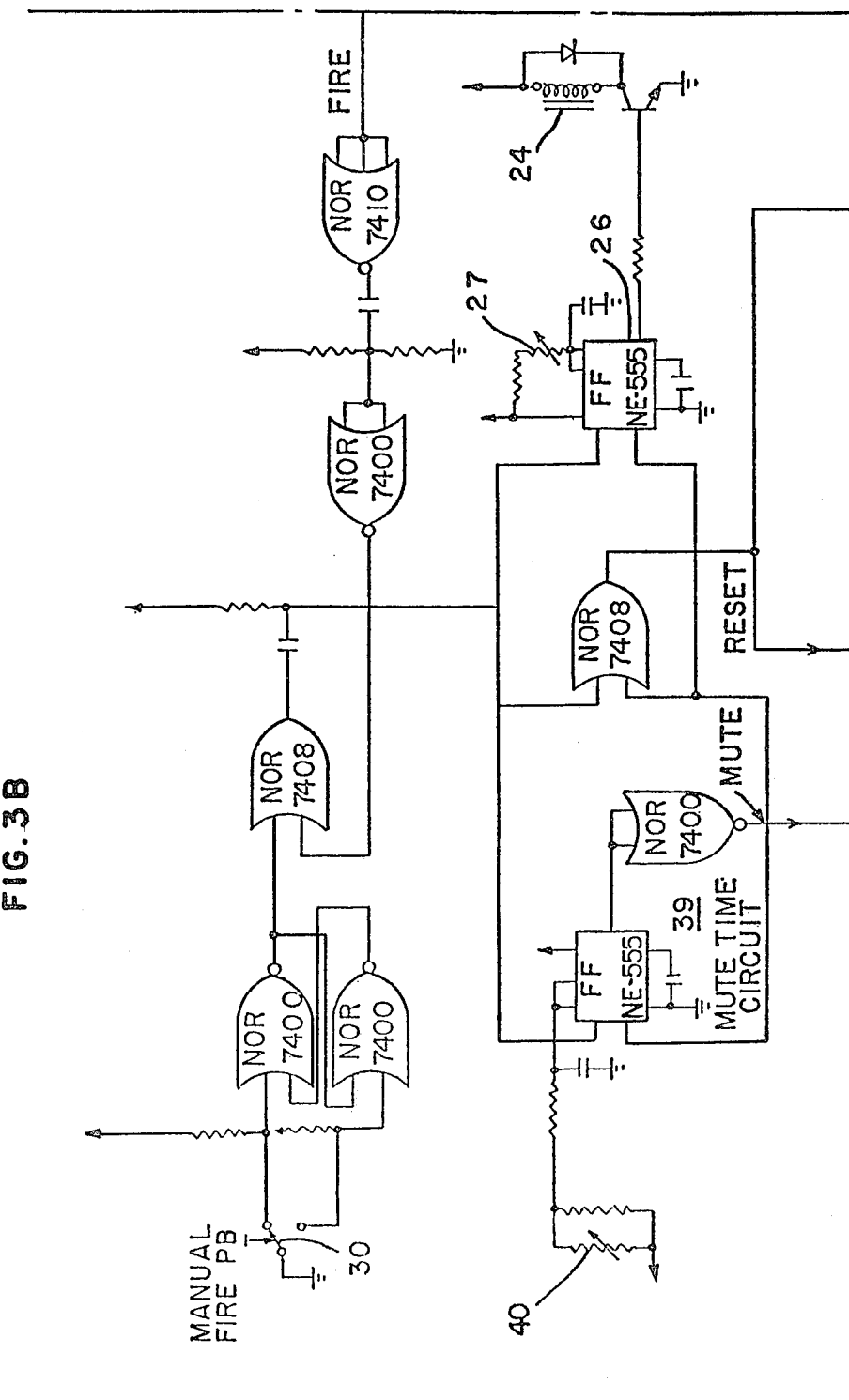

FIG. 3B shows the mute time circuit 39 having a potentiometer 40 which is used to adjust the mute time. The solenoid valve driver 26 is a flip-flop having a potentiometer 27 for controlling the time length of the initiating acoustic pulses. The flip-flop receives a fire signal from the firing time control circuit 29, shown in FIG. 3C, or it receives a fire signal from the manual fire push button 30.

Figure 3C:
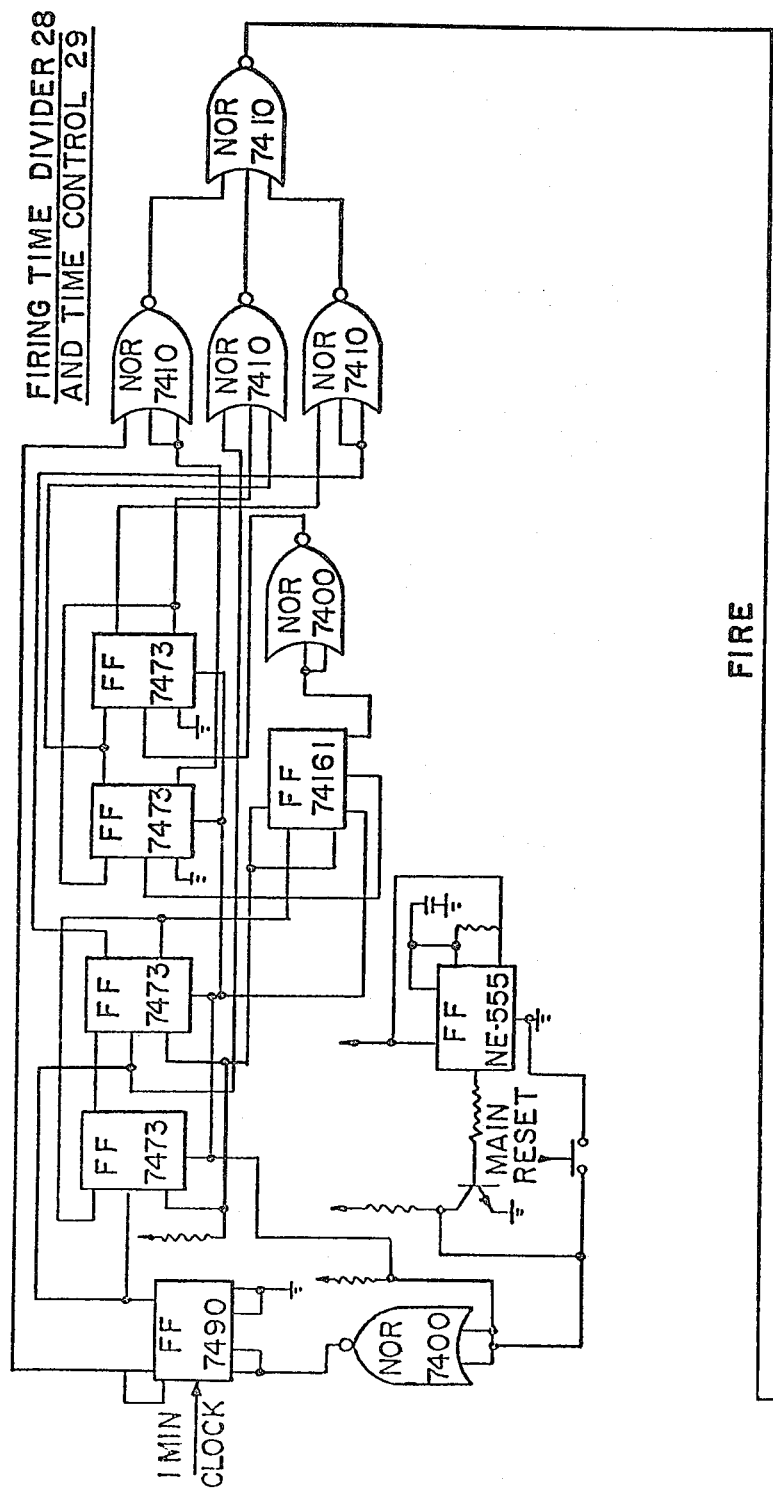

FIG. 3C shows the firing time divider circuit 28 and the time control circuit 29. These circuits receive clock pulses at one-minute intervals and produce fire pulses at intervals of five minutes, ten minutes, or 30 minutes.

Figure 3D:
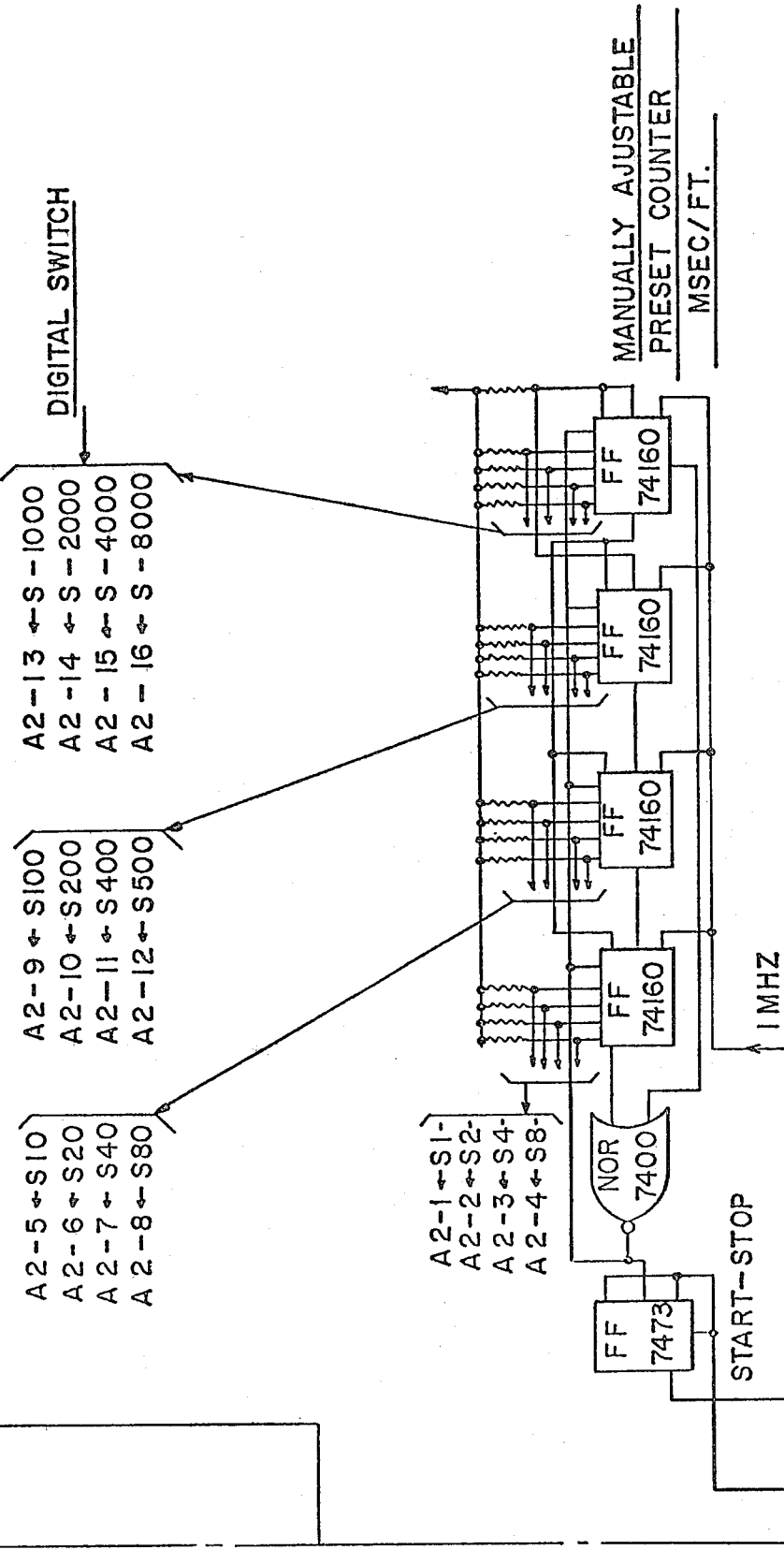

FIG. 3D shows the manually adjustable preset counter 35. The digital switch is indicated diagrammatically. The manually settable digital switch 41 is of the type manufactured by Electronic Engineering Company of California, four-digit unit, Model 4B1776206. The connections are as indicated.

FIG. 3E shows the depth counter 36 and the elapsed time accumulator 45. In one actual embodiment of the invention, the L-100 incandescent four-digit readout manufactured by Luminetics Corporation of Fort Lauderdale, Florida, was employed as the display 42. The digital printer 43 was the model PN107 Sodeco Impulse Counter manufactured by a division of Landis & GYR, Elmsford, New York. An interface unit P-105 is used to convert from the BCD code to the printer code. The multiplexing of the input to the display 42 and printer 43 is controlled by the Time/Depth Print Controller of the circuit shown in FIG. 3A so that the time and depth of any one reading are printed sequentially on the printer tape.

FIG. 5 shows a buildup curve 55 that can be derived by plotting the data shown in FIG. 4. These data would be obtained with an automatic firing time rate of every five minutes during the first hour, every ten minutes during the second and third hours, and every half-hour thereafter.

FIG. 6 shows a drawdown curve 56 that can be derived by plotting data obtained with the monitor of the present invention. The timing of the initiating pulses is the same as in the buildup curve.

Smooth curves such as shown in FIGS. 5 and 6 can be expected to result from data obtained with the monitor if the produced fluid is absent gas. With the presence of gas slugs which break out, there will appear sharp changes in the curves, particularly during a buildup test. However, because of the large number of data points, corrections may be made to smooth the shape of the curve.

Curves 55 and 56, shown in FIGS. 5 and 6, are useful in the interpretation of well performance as well as equipment performance. These curves may be used to determine the efficiency of the pump and to establish pump cycle time. For example, in establishing efficiency of a pump, a straight line 57 is drawn as an extension of the straight line segment 58 of the curve 56. The intersection of the line 57 with the abscissa establishes the data for computing pump efficiency. In the example shown, the pump is withdrawing liquids at the rate of 85 feet per hour. Knowing the volume per foot of the annulus in the well, one may readily convert feet per hour to barrels per hour and thus compare this figure with the rate at which the pump should be producing under the field-operating conditions for that pump. If the value established from the curve of FIG. 6 is well below that of the field rating of the pump, then the operator may desire to pull the pump and make repairs to seals or to moving parts thereof to restore efficiency.

Pump cycle time can likewise be established from the data of the curves of FIGS. 5 and 6. It is desirable that the amount of buildup in the well be held to a level such that the back pressure does not materially impede the inflow rate of liquids. Likewise, it is undesirable to continue the operation of the pump after the liquid level has fallen below the level of the pump inlet. To do so would cause physical damage by reason of pounding.

Having information as provided by the data in FIGS. 5 and 6, one has knowledge as to the rate of inflow as well as the pump rate and therefore may establish pump cycle time for most efficient production of the well.

The data represented in the buildup curve 55 of FIG. 5 together with casing pressure from page 70 can be utilized to determine an estimate of formation pressure. There are a number of techniques to determine formation pressure, one of them described in an article entitled, "Use of Data on the Build-up of Bottom-hole Pressures", by Morris Muskat, appearing in SPE Reprint Series No. 9, Pressure Analysis Methods, AIME, 1967.

While a particular embodiment of the invention has been shown and described, various modifications are within the true spirit and scope of the invention. One modification is to utilize a digital-to-analog converter driven by the depth counter to provide an analog strip chart recording of the depth of the liquid surface vs. time. The following claims are, therefore, intended to cover all such modifications.

What is claimed is:

1. Apparatus for determining the location of the liquid surface in a well drilled through the substrata of the earth comprising:
   a source of acoustic pulses coupled to said well;
   a transducer coupled to said well producing an electric signal in response to the occurrence of acoustic pulses in said well;
   a clock pulse source;
   digital counting means;
   gating means responsive to the output of said transducer for starting the counting of clock pulses by said digital counting means upon the occurrence of an acoustic pulse in said well and for stopping said counting upon detection of the acoustic pulse reflected from the liquid surface in said well;
   a digital readout device responsive to said digital counting means for indicating the depth of said liquid surface; and
   means for gating out acoustic pulses for adjustable periods of time during and after the generation of each initiating acoustic pulse.

2. The apparatus recited in claim 1 wherein said digital counting means includes:
   a manually adjustable pulse counter producing one pulse output for an adjustable number of input pulses, said clock pulses being applied as input pulses, said adjustable pulse counter having means for manually changing the number of input pulses producing an output pulse in order to calibrate said depth counter for variations in acoustic velocity; and
   a depth counter for accumulating a pulse for each increment of depth in said well.

3. The apparatus recited in claim 1 wherein the first named gating means includes:
   a first circuit having an adjustable trigger level, said transducer being connected to said first circuit to produce a start pulse upon the occurrence of the initiating acoustic pulse in said well, said start pulse being applied to start the counting of said clock pulses; and
   a second circuit having an adjustable trigger level, said transducer being connected to said second circuit to produce a stop pulse upon indication of an acoustic pulse reflected from the liquid surface in said well, said stop pulse being connected to stop said counting.

4. The apparatus recited in claim 3 wherein the second named gating means comprises
   a calibrated mute time circuit actuated coincidentally with the initiating acoustic pulses and connected to said second circuit to render it inoperative for a known adjustable period of time during and after the occurrence of each initiating acoustic pulse.

5. The apparatus recited in claim 1 wherein said means for repetitively actuating said source of acoustic pulses includes:
   a firing time rate circuit, said clock pulses being connected to said firing time rate circuit, said firing time rate circuit having means for adjusting the repetitive firing time of said source of acoustic pulses.

6. The apparatus recited in claim 1 wherein said well has a string of tubing disposed within a casing and wherein said source of acoustic pulses and said transducer are coupled to the annulus between said string and said casing.

7. The apparatus recited in claim 1 wherein said readout digital device is a digital memory for periodically storing digital counts representing the depth of said liquid surface and the time at which said depth is measured.

8. The apparatus recited in claim 7 further comprising means for storing casing pressure in said digital memory.

9. The apparatus recited in claim 8 further comprising:
   a digital printing recorder responsive to said digital memory for selectively printing the stored digital depths, time and pressure.

10. The apparatus recited in claim 1 further comprising:
    means responsive to said clock pulse source for repetitively actuating said source of acoustic pulses so that said digital readout device produces an indication of said depth at predetermined times over a period of time; and
    calibration means for adjusting the depth indication for different acoustic velocity characteristics of said well.

11. The method of determining the depth of the liquid surface in a well comprising:
    repetitively generating as a function of time initiating acoustic pulses in an annulus between a casing and a tubing string to produce indications of liquid surface depth at predetermined times over a period of time;
    detecting acoustic pulses reflected from said liquid surface;
    gating out acoustic pulses for adjustable periods of time during and after the generation of each initiating acoustic pulse;
    counting clock pulses in the intervals between the generation of each initiating acoustic pulse and the detection of the reflected acoustic pulse; and
    repetitively producing a digital count as a measure of the depth of the liquid level in said well.

12. The method recited in claim 11 wherein said well has a casing with a pump suspended from a tubing string disposed within said casing, further including calibrating for variations in the acoustic velocity characteristics of the well by the steps of:
    pumping the liquid in said well down to the known level of the pump inlet in said well and while maintaining the liquid level approximately at the pump inlet repetitively generating initiating pulses; and
    between initiating pulses changing the number of clock pulses counted until the digital count corresponds with the known level of said pump inlet in said well.

13. The method recited in claim 11 further comprising recording a digital count which measures casing pressure.

14. The method recited in claim 11 wherein acoustic pulses are repetitively generated automatically, and accumulating periodic pulses after the start of the automatic generation of acoustic pulses, and
    performing the step of recording the time by recording the accumulated periodic pulses.

15. The method recited in claim 11 wherein said well has a casing with a pump suspended from a tubing string disposed within said casing, said method further comprising:

controlling the operation of said pump from said digital count to maintain the depth of the liquid level in said well at a desired level.

16. The method recited in claim 11 further comprising shutting said well in and recording the buildup characteristic in said well.

17. The method recited in claim 11 further comprising pumping said well and recording the drawdown characteristic of said well.

18. The method recited in claim 11 further comprising simultaneously recording the casing pressure for each recorded indication of depth.

19. The method recited in claim 11 further comprising:

storing the digital measured time intervals, and
thereafter printing out a record of liquid level depth at each of said preset times.

20. The method recited in claim 11 further comprising:

recording the time of each initiating acoustic pulse; and
recording the digital count which measures the depth of the liquid level concurrently with each recording of time, whereby the rate of change in the depth of the liquid surface can be determined from the recordings.

21. The method recited in claim 20 further comprising recording a digital count representing casing pressure.

22. The method recited in claim 20 further comprising:

recording the digital count which measures the depth of the liquid level and recording the time of each initiating acoustic pulse.

23. The method recited in claim 20 wherein the generation of initiating acoustic pulses is by the steps of:

opening a solenoid-operated valve which communicates with said annulus to release gas under pressure; and
changing the time that said solenoid valve remains open to change the acoustic properties of said initiating pulses.

24. The method recited in claim 20 wherein said well has a casing with a pump suspended from a tubing string disposed within said casing, further including calibrating for variations in the acoustic velocity characteristics of the well by the steps of:

filtering the detected acoustic pulses to produce an output representing only acoustic pulses reflected from collars in said tubing string;
muting the circuitry which stops said counting of clock pulses for a time after the generation of each initiating acoustic pulse so that only reflections from collars near the middle of said string are detected;
changing the muting time to detect reflections from the next adjacent collar; and
calibrating the acoustic velocity from known distance between said tubing collars.

25. Apparatus for determining the location of the liquid surface in a well having a casing with a pump suspended from a tubing string disposed within said casing comprising:

a source of acoustic pulses coupled to said well;
a transducer coupled to said well producing an electric signal in response to the occurrence of acoustic pulses in said well;
a clock pulse source;
digital counting means;
gating means responsive to the output of said transducer for starting the counting of clock pulses by said digital counting means upon the occurrence of an acoustic pulse in said well and for stopping said counting upon detection of the acoustic pulse reflected from the liquid surface in said well;
a digital readout device responsive to said digital counting means for indicating the depth of said liquid surface;
means responsive to said clock pulse source for repetitively actuating said source of acoustic pulses so that said digital readout device produces an indication of said depth at predetermined times over a period of time;
calibration means for adjusting the displayed depth indication of different acoustic velocity characteristics of said well; and
a selectable band pass filter connected between said transducer and said gating means, said filter being settable for first band pass which passes transducer outputs representing acoustic pulses reflected from the liquid surface of said well and a second band pass which passes transducer outputs representing acoustic pulses reflected from collars in said tubing string.

26. The method of determining the depth of the liquid surface in a well having a casing with a pump suspended from a tubing string disposed within said casing comprising:

generating as a function of time initiating acoustic pulses in an annulus between a casing and a tubing string to produce indications of liquid surface depth at predetermined times over a period of time;
detecting acoustic pulses reflected from said liquid surface;
digitally counting clock pulses in the intervals between the generation of each initiating acoustic pulse and the detection of the reflected acoustic pulse;
starting said counting in response to the occurrence of an initiating acoustic pulse in said well;
stopping and counting upon detection of the reflected acoustic pulse;
said initiating acoustic pulses being generated at preset times in response to said clock pulses;
repetitively producing a digital count as a measure of the depth of the liquid level in said well;
recording said digital count which measures the depth of liquid level and recording the time of each initiating acoustic pulse; and
calibrating for variations in the acoustic velocity characteristics of the well by the steps of:
filtering the detected acoustic pulses to produce an output representing only acoustic pulses reflected from collars in said tubing string;
muting the circuitry which stops said counting of clock pulses for a time after the generation of each initiating acoustic pulse so that only reflections from collars near the middle of said string are detected;
changing the muting time to detect reflections from the next adjacent collar; and calibrating the acoustic velocity from known distance between said tubing collars.

27. The method of determining the depth of the liquid surface in a well comprising:
repetitively generating as a function of time initiating acoustic pulses in an annulus between a casing and a tubing string to produce indications of liquid surface depth at predetermined times over a period of time;
detecting acoustic pulses reflected from said liquid surface;
gating out acoustic pulses for adjustable periods of time during and after the generation of each initiating acoustic pulse;
counting clock pulses in the intervals between the generation of each initiating acoustic pulse and the detection of the reflected acoustic pulse;
repetitively producing a digital count as a measure of the depth of the liquid level in said well;
detecting reflections of said initiating acoustic pulses reflected from collars in a string of tubing disposed in said well;
gating out acoustic pulses for increasingly longer periods of time for successive initiating acoustic pulses until the first occurring reflected acoustic pulses from the surface of said liquid are detected;
changing the liquid level in said well by pumping to verify that the detected pulse is reflected from the surface of said liquid;
thereafter decreasing the time during which acoustic pulses are gated out until the detected acoustic pulses are reflected from adjacent collars of said tubing; and
calibrating for acoustic velocity from known distance between said tubing collars.

* * * * *

UNITED STATES PATENT AND TRADEMARK OFFICE
CERTIFICATE OF CORRECTION

PATENT NO. : 4,318,298
DATED : March 9, 1982
INVENTOR(S) : JOHN K. GODBEY ET AL

It is certified that error appears in the above—identified patent and that said Letters Patent is hereby corrected as shown below:

Column 8, line 59, "page" should read --gage--.

Column 11, line 39, "20" should read --11--.

Column 11, line 47, "20" should read --11--.

Column 12, line 48, "and" should read --said--.

Signed and Sealed this

Sixth Day of August 1985

[SEAL]

Attest:

DONALD J. QUIGG

Attesting Officer     Acting Commissioner of Patents and Trademarks